(12) United States Patent
Otten, III et al.

(10) Patent No.: US 7,535,647 B1
(45) Date of Patent: May 19, 2009

(54) BEAM SPLITTERS FOR, FOR INSTANCE, HIGH EFFICIENCY SPECTRAL IMAGERS

(76) Inventors: Leonard John Otten, III, 2401 Reserve Dr., Williamsburg, VA (US) 23185; Gavin R. G. Erry, 6350 Eubank NE., Apt. 722, Albuquerque, NM (US) 87111

( * ) Notice: Subject to any disclaimer, the term of this patent is extended or adjusted under 35 U.S.C. 154(b) by 73 days.

(21) Appl. No.: 11/803,398

(22) Filed: May 11, 2007

Related U.S. Application Data (63) Continuation-in-part of application No. 11/481,441, filed on Jul. 5, 2006, now abandoned, which is a continuation of application No. 10/723,901, filed on Nov. 25, 2003, now Pat. No. 7,167,249, application No. 11/803,398, which is a continuation-in-part of application No. 11/078,019, filed on Mar. 11, 2005, which is a continuation of application No. 10/651,491, filed on Aug. 29, 2003, now Pat. No. 6,992,775.

(51) Int. Cl.
  *G02B 27/14* (2006.01)
(52) U.S. Cl. .................................. 359/634; 359/629
(58) Field of Classification Search ............... 359/629, 359/634
See application file for complete search history.

(56) References Cited

U.S. PATENT DOCUMENTS

| 4,181,440 A | * | 1/1980 | Frosch et al. | 356/451 |
|---|---|---|---|---|
| 5,708,530 A | * | 1/1998 | Huang | 359/634 |
| 5,914,817 A | * | 6/1999 | Browning et al. | 359/634 |
| 6,687,007 B1 | * | 2/2004 | Meigs | 356/456 |

* cited by examiner

*Primary Examiner*—Jessica T Stultz
*Assistant Examiner*—Mahidere S Sahle
(74) *Attorney, Agent, or Firm*—DeWitt M. Morgan (57) ABSTRACT

Optical instruments having, inter alia, optics to process wavelengths of electromagnetic radiation to produce an interferogram. The instruments include an optical path and optical elements positioned along this path for splitting and recombining the wavelengths which interfere with each other to produce a plurality of different fringes of different wavelengths. The optics include matched gratings which are positioned along the optical path outside of the interferometer optics to produce first and second sets of spectrally dispersed beams. The interferometer optics includes a beam splitter and first and second mirrors. In two embodiments the beam splitter has an internal surface including three zones. The instruments can all include a detector for detecting the interferogram and means for processing the detected interferogram to produce spectral information that is spatially distributed.

17 Claims, 9 Drawing Sheets

BEAM SPLITTERS FOR, FOR INSTANCE, HIGH EFFICIENCY SPECTRAL IMAGERS

PRIOR APPLICATIONS

This invention is a continuation-in-part of application Ser. No. 11/481,441, filed Jul. 5, 2006 and now abandoned, which is a continuation of application Ser. No. 10/723,901, filed on Nov. 25, 2003, now U.S. Pat. No. 7,167,249 B1, the disclosures of which are incorporated by reference. This application is also a continuation-in-part of application Ser. No. 11/078,019, filed Mar. 11, 2005, which is a continuation of application Ser. No. 10/651,491, now U.S. Pat. No. 6,992,775 B1. Insofar as these latter two relate to beam splitters, the disclosures are incorporated by reference.

GOVERNMENTAL RIGHTS CLAUSE

This invention is made with U.S. Government support under contracts F 29601-96-C-0096 and F29601-98-0204 awarded by the U.S. Air Force. The U.S. Government has certain rights in the invention.

FIELD OF THE INVENTION

Optical instruments which process wavelengths of electromagnetic radiation to produce an interferogram. More particularly, instruments (e.g., Fourier transform spectrometers) that produce interferograms of a spatially resolved scene, which instruments include an optical system which both splits the incoming light and physically separates it to produce two beams. U.S. Pat. No. 6,687,007 B1 to Meigs discloses embodiments wherein a matched pair of gratings is positioned inside the interferometer optics to further disperse the two beams. U.S. Pat. No. 7,167,249 B1 and application Ser. No. 11/481,441 (now abandoned) discloses embodiments wherein the matched pair of gratings are positioned outside the interferometer optics to further disperse the two beams.

The claimed invention relates to a new beam splitter which, like the beam splitter disclosed in the parent applications, eliminates the 50% light loss inherent in the Sagnac (or common path) interferometer. Two embodiments include the further improvement that both beams go through the same amount of glass (i.e., each have the same path length), so that the aberrations for both are identical. The net result is that such identical aberrations cancel each other out.

The instruments are useful in absorption, emission, or reflected spectroscopy where there is a need to image a time and spatially varying scene. This could be, but is not limited to imaging laser material interactions, an emission plume for a jet or rocket engine or a smoke-stack, environmental observations, non invasive blood monitoring, and other medical observations.

BACKGROUND OF THE INVENTION

Imaging spectrometers are, broadly speaking, optical instruments which process the electromagnetic radiation from a source into its fundamental components. For instance, an interferometric based spectrometer divides light from a source and interferes it to produce a fringe pattern of interfering light (i.e., an interferogram). The interference pattern can be captured on film or by, for instance, an electronic detector, for example, a semi-conductor array detector (e.g., a charged coupled device (CCD)).

Figure 1:
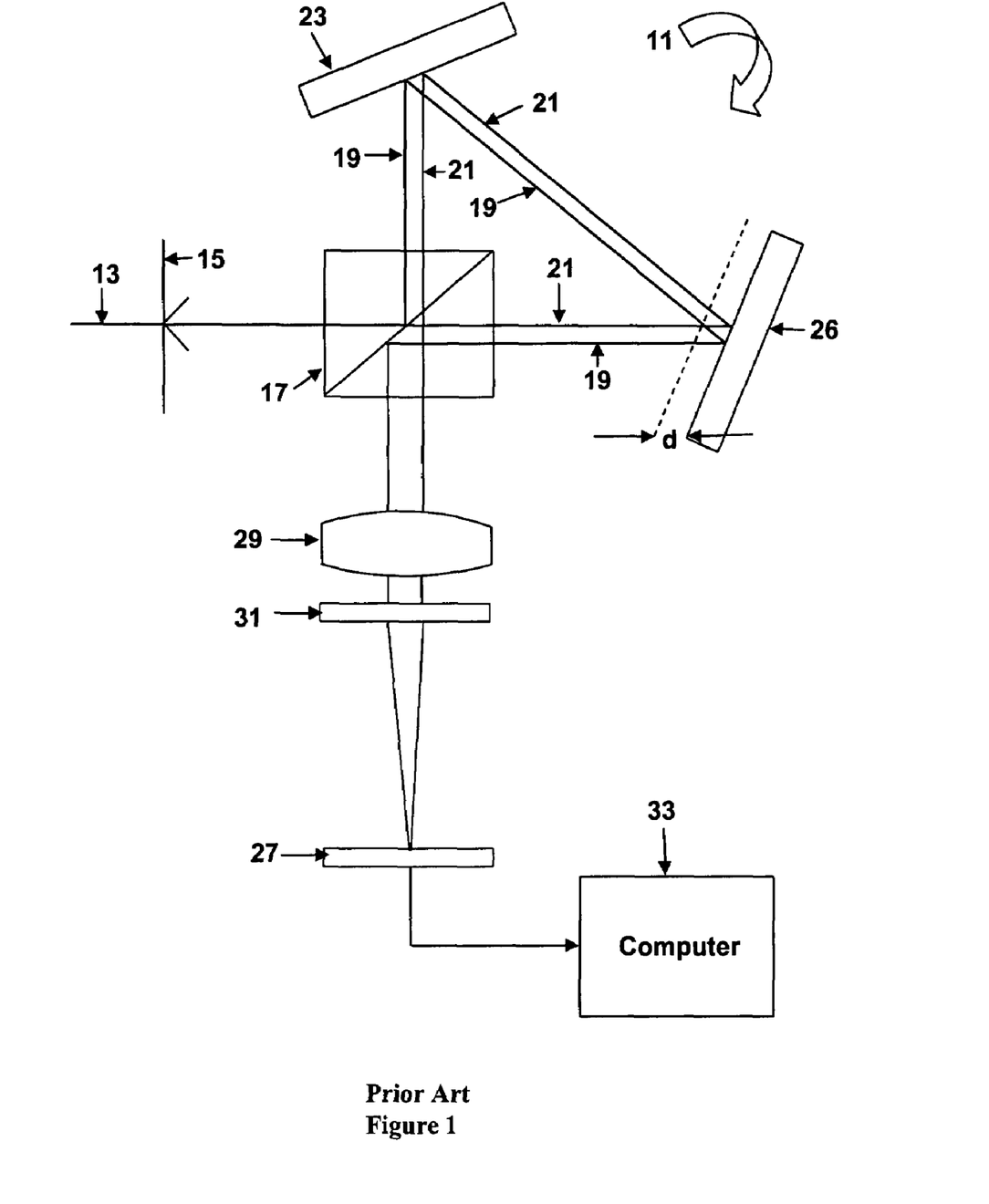
FIG. 1 is an optical schematic of a prior art spectrometer incorporating a common path or Sagnac interferometer.

There are numerous optical interferometer designs. The basic form of the Sagnac (or common path) interferometer is illustrated in FIG. 1. It is also illustrated in U.S. Pat. No. 4,976,542 to Smith. Other designs include the Mach-Zender interferometer, the Michelson interferometer and Twyman-Green interferometer (See W. L. Wolfe, Introduction to Imaging Spectrometers, SPIE Optical Engineering Press, pp. 60-64, 1997), the Fabry-Perot interferometer (see Wolfe, p. 70-73), the Lloyd's mirror interferometer (see the Smith patent) and, a variation of the common path interferometer (Sagnac) sometimes referred to as the Barnes interferometer (see T. S. Turner Jr., et al., A Ruggedized Portable Fourier Transform Spectrometer for Hyperspectral Imaging Applications, SPIE Vol. 2585 pp 222-232.) There are also dispersive spectrometers such as prism spectrometers and grating spectrometers. (See Wolfe, pp. 50-52 and 55-57).

In a non-imaging Fourier transform spectrometer the point source of radiation is split into two virtual points a fixed distance apart to yield a fringe pattern at the detector. If one wants to attain a fine spectral resolution, the distance between the two virtual points should be large; for a course spectral resolution, it should be very small. This distance may be controlled by shifting one of the mirrors (typically referred to as lateral shear) of, for instance, the common path interferometer. With this arrangement, a wide spectral range measurement loses resolution, while a high resolution measurement reduces the effective spectral range. In an imaging spectrometer, the point source is imaged with a set of imaging optics and a slit is inserted giving the instrument the capability of one-dimensional imaging in the direction perpendicular to the shear.

Shear, both lateral and angular, is discussed in Turner, Jr. et al. (supra). For the Sagnac, translation of either mirror in the plane of FIG. 1 produces lateral shear. Mirror tilt about an axis perpendicular to the drawing plane also produces lateral shear. Conversely, in the Barnes interferometer only angular shear is possible and is produced only by mirror tilt. See FIGS. 2 and 3 of Turner, Jr., et al.

U.S. Pat. No. 4,976,542 to W. H. Smith discloses a Fourier transform spectrometer which incorporates the common path (or Sagnac) interferometer and in which a charge-coupled device (CCD) is placed in the image plane instead of film. The CCD has pixels aligned along two dimensions to provide both spectral resolution and spatial resolution. The CCD is characterized by greater dynamic range, lower pixel response variation, and is photon nose limited, all of which enhances its use as a detector for a spectrometer. See also Digital Array Scanned Interferometers for Astronomy, W. H. Smith, et al., Experimental Astronomy 1: 389-405, 1991. In these devices, the interferometer introduces lateral shear in one direction and a two dimensional camera is aligned so a row of pixels is parallel to this geometric plane. In the perpendicular direction, a set of cylindrical lenses is used to provide an imaging capability along the columns of pixels. A row plot from the detector is an interferogram similar to the interferogram collected in a temporally modulated Michelson interferometer.

OBJECTS OF THE INVENTION

It is an object of the present invention to provide an improved beam splitter.

It is also an object of the present invention to provide an improved beam splitter in which both portions of the split beam pass through an amount of glass so that they both have the same optical path length.

It is an additional object of the present invention to provide a Fourier transform spectrometer with the improved beam splitters which has all the advantages of the spectrometers disclosed in U.S. Pat. No. 6,687,007 B1 to Meigs, but which has an increased optical throughput.

It is another object of the present invention to provide a Fourier transform spectrometer with the improved beam splitters of the present invention which both splits and spectrally disperses incoming wavelengths to produce two spectrally dispersed beams in which the long wavelengths within the range of wavelengths of interest do not overlap.

It is yet another object of the present invention to provide a Fourier transform spectrometer with the improved beam splitters of the present invention which utilizes a matched pair of gratings to spectrally disperse the incoming beam of wavelengths, which pair of gratings are located outside that portion of the spectrometer's optical system, the interferometer optics portion, which splits the incoming beam into two paths.

It is still another object of the present invention to provide an improved beam splitter which can be used in a common path interferometer without the use of dispersive gratings.

The foregoing and other objects will be apparent from the drawings and the description set forth herein.

SUMMARY OF THE INVENTION

The present invention relates to novel beam splitters including an optically transmissive member. The incumbent beam to be split is directed onto the first surface of the optically transmissive member, which surface may be an internal surface. The first surface is divided into first, second and third zones. In each of these zones, the percentage of light that is either reflected or transmitted is described as "substantially" for the reason that no optics can be perfect. While there will be a minimal amount of loss inherent to the optics, high quality parts can reduce this loss to, in some cases less than 1% of the total irradiance of the wavelengths incident. The first zone has a first coating which, for the wavelengths being split, is substantially 100% reflective. The second zone has a second coating which allows for substantially 50% of the wavelengths to be reflected and 50% to be transmitted. The third zone is substantially 100% transmissive. The second zone is between the first and the third zone. Optionally, there are uncoated regions between the first and second zones and between the second and third zones. The novel beam splitter designs are incorporated into interferometers and can be used with or without the dispersive gratings of, for instance, the type disclosed herein.

In one embodiment, in addition to the first surface, there are second and third surfaces which are parallel to each other and to the first surface. In the third embodiment, the beam splitter is in the form of a cube formed of two prisms, with the coatings on one of the two diagonal mating surfaces. The outer surfaces may have anti-reflective coatings.

DESCRIPTION OF THE PREFERRED EMBODIMENTS

With reference to FIG. 1, Fourier transform spectrometer 11 processes an incident light source 13 through an aperture 15, to a beam splitter 17, where source 13 is divided into a reflected beam (represented by central ray path 19) and a transmitted beam (represented by central ray path 21). The portion of source 13 represented by path 19 is reflected from the front surface a first mirror 23 to the front surface a second mirror 26, and then back to beam splitter 17. The second, transmitted portion of source 13 is reflected off second mirror 26, back to first mirror 23 and through beam splitter 17. Thus, beam splitter 17, together with mirrors 23 and 25, serve to split incident source 13 into two portions. Spectrometer 11 also includes a detector 27 which is placed at the back focal plane of spherical (Fourier) lens 29. (Aperture 15 is in the front focal plane.) A second, cylindrical lens 31 is interposed between detector 27 and spherical lens 29, which images spatial locations from 15 onto detector 27. As is well known in the art, spherical lens 29 and cylindrical lens 31 may be assembled from one of several optical elements in various sequences to minimize optical aberrations. As is well understood in the art, this basic arrangement produces an interfering light pattern or fringe pattern at the focus of spherical lens 29, commonly referred to as an interferogram. Cylindrical lens 31 images the relative physical distribution of source 13 as selected by aperture 15 such that as it impinges on detector 27 it represents the relative spacing for the various sources and their locations in source 13. The detector 27 may be a charge-coupled device, or CCD. Alternatively, any photon counting array noise limited device, or other means of recording the optical signature, may be used. For an electric device, the output of detector 27 is processed by a computer 33 using Fourier transform techniques as is well known in the art to resolve the spectrum detected by detector 27. In this configuration fully half of the light that enters beam splitter 17 and leaves the device is lost when beams 21 and 19 pass through beam splitter 17 the second time.

Figure 2:
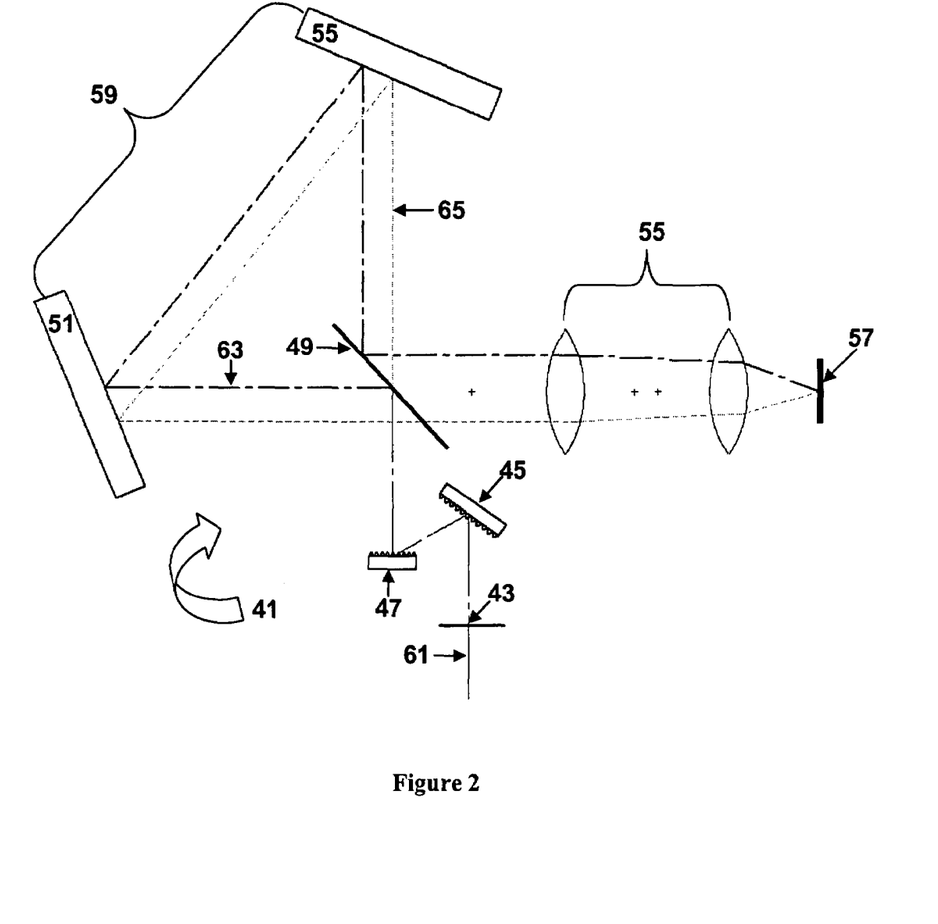
FIG. 2 is an optical schematic of the first embodiment of the present invention incorporated in a Sagnac interferometer in which the grating pair is placed in front of the interferometer.

To correct the problems inherent in the interferometer of Okamoto et al., discussed in parent application Ser. Nos. 10/723,901 and 11/481,441, and achieve the objectives set forth above, a pair of matched gratings is incorporated into the interferometer of the present invention. Thus, with reference to FIGS. 2 and 3, matched gratings have been integrated into the conventional interferometer design. FIG. 2, spectrometer 41, includes an aperture 43, first and second matched gratings 45 and 47, beam splitter 49, first mirror 51, second mirror 53, lens system 55 and detector 57. For grating pair 45, 47, the choice of grating pitch, grating order, etc., is determined in the manner set forth with regard to, for instance, the embodiments of FIGS. 2 and 3 of U.S. Pat. No. 6,687,007 B1. Beam splitter 49, is, in this embodiment, of conventional design. Mirrors 51 and 53 are typically first surface mirrors. Beam splitter 49, together with mirrors 51 and 53 is sometimes referred to as interferometer optics 59. Lens system 55 is of the conventional Fourier lens/cylindrical lens combination used to image spatial locations from aperture 43 onto detector 57, and interfere the separated beams as discussed above with regard to FIG. 1. Further, as with the prior embodiment, the output of detector 57 is processed by a computer (not shown) using well known Fourier transform technique to resolve the spectrum detected.

In operation, incident light, represented by central ray path 61, passes through aperture 43 and onto first and second gratings 45 and 47 where it is dispersed to produce the desired amount of lateral wavelength dependant spectral spreading of the light. This is illustrated in FIG. 2 of U.S. Pat. No. 6,687,007 B1. As with, for instance, the embodiments of FIGS. 2 and 3 of U.S. Pat. No. 6,687,007 B1, in addition to producing the desired lateral wavelength dependant spectral spreading, the use of grating pair 45 and 47 allows for an easy adjustment of the amount of lateral spectral spread in the system, without introducing any optical aberrations, because the gratings diffract light only in a plane perpendicular to the grooves.

After being dispersed by gratings 45 and 47, the light is divided into a reflected beam, represented by central ray path 63 and a transmitted beam, represented by central ray path 65. As those skilled in the art appreciate, ray paths 63 and 65 separated by mirrors 53 and 51 and are recombined by lens system 55 and focused onto detector 57. This invention has the advantage over the prior art of allowing spectral mapping to be conducted at selectable wavelengths, defined by the choice of grating specifications, and thus increasing the spectral resolution over the selected waveband.

Figure 3:
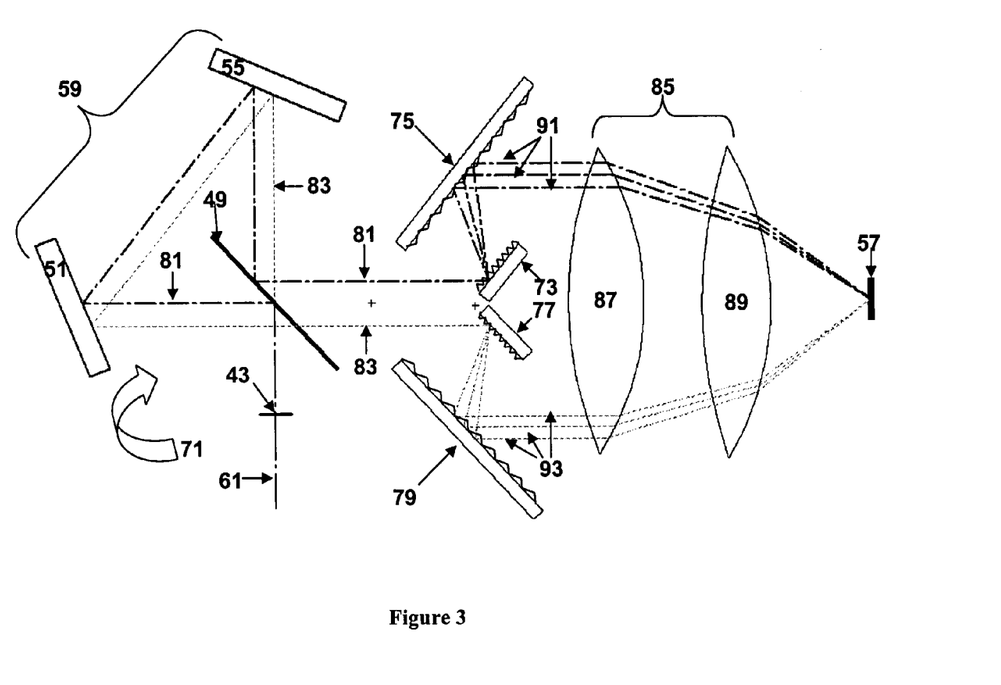
FIG. 3 is an optical schematic of the second embodiment of the present invention, in which the grating pair is positioned along the optical path of the interferometer after the interferometer optics.

FIG. 3, spectrometer 71 illustrates an alternate embodiment of the present invention in which the grating pair is positioned after the interferometer optics. Spectrometer 71 includes aperture 43, beam splitter 49, first mirror 51 and second mirror 53 of interferometer optics 59, and detector 57, which are identical to those depicted in FIG. 2 and function to split incident radiation into two separate beams. FIG. 3 also depicts lens system 85 which is the functional equivalent of lens system 55 of FIG. 2. As is well known in the art, lens system 85 includes a spherical (Fourier) lens 87 and a cylindrical lens 89 and functions to recombine the split beam paths onto detector 57 and image spatial locations defined by aperture 43 onto detector 57. As is well known in the art, spherical lens 87 and cylindrical lens 89 may be assembled from one of several optical elements in various sequences to minimize optical aberrations. FIG. 3 further depicts the incorporation of first pair of gratings 73 and 75, and second pair of gratings 77 and 79. For grating pairs 73, 75 and 77, 79, the choice of grating pitch, grating order etc. is determined in the manner set forth with regard to, for instance, the embodiments of FIGS. 2 and 3 of U.S. Pat. No. 6,687,007 B1. The embodiment of FIG. 3 of the current application differs from the invention of the prior application in that the reflected beam and transmitted beam are dispersed by separate and distinct pair of gratings. This arrangement is necessary as the beam of light is dispersed subsequent to being split. This arrangement, as in the previous embodiment, has the benefit of allowing spectral mapping to be conducted over selectable wavelengths based on the grating parameters thus increasing the spectral resolution over the selected waveband.

In operation, with reference to FIG. 3, incident light, represented by central ray path 61 is divided into a reflected beam, represented by central ray path 81, and a transmitted beam (represented by central ray path 83) by interferometer optics 59. Path 81 is directed onto a first pair of gratings 73 and 75. The gratings, as is well known in the art, function to spectrally disperse the incoming beam path to produce the required amount of lateral spread in the wavelengths. The dispersed beam is depicted in FIG. 3 as three beam paths collectively referred to as dispersed beam path 91. Beam path 91 is then focused by lens system 85 onto detector 57. Path 83 is spectrally dispersed in the same manner by a second pair of gratings 77 and 79 to produce dispersed beam path 93, which is depicted in FIG. 3 as three beam paths. Gratings 73 and 75 are symmetrically opposed and identical in all other respects to gratings 77 and 79. Dispersed paths 91 and 93, as those skilled in the art appreciate, are recombined by lens system 85 and both interfered and focused onto detector 57.

The beam splitter 49 (and ultimately interferometer 59 which is commonly referred to as a Sagnac or common path interferometer) of FIGS. 1, 2 and 3 is of conventional design and is well known in the art. One inherent disadvantage of this conventional beam splitter design is that it ultimately loses at least 50% of the incident light during the beam splitting process as those skilled in the art will appreciate. This deficiency is evident from FIGS. 1, 2 and 3. In FIG. 3, for example, incoming beam path 61 is split into central ray paths 81 and 83, each representing 50% of the original light. Path 81 is reflected by mirrors 51 and 53 and directed back toward beam splitter 49. Beam splitter 49 functions in exactly the same manner as described above in that it reflects 50% of the incident radiation light and transmits 50%. The 50% that is transmitted is not available to be directed to the detector, representing a loss in optical throughput. Thus the remaining light represents at a maximum only 25% of the total incident light. The total light of path 83 is similarly reduced with the difference that after being reflected by mirrors 51 and 53 onto beam splitter 49, the reflected portion of the incident light is lost from the system. Thus, the total throughput of the spectrometer is reduced by 50% relative to the light which is inputted into the system.

Figure 4:
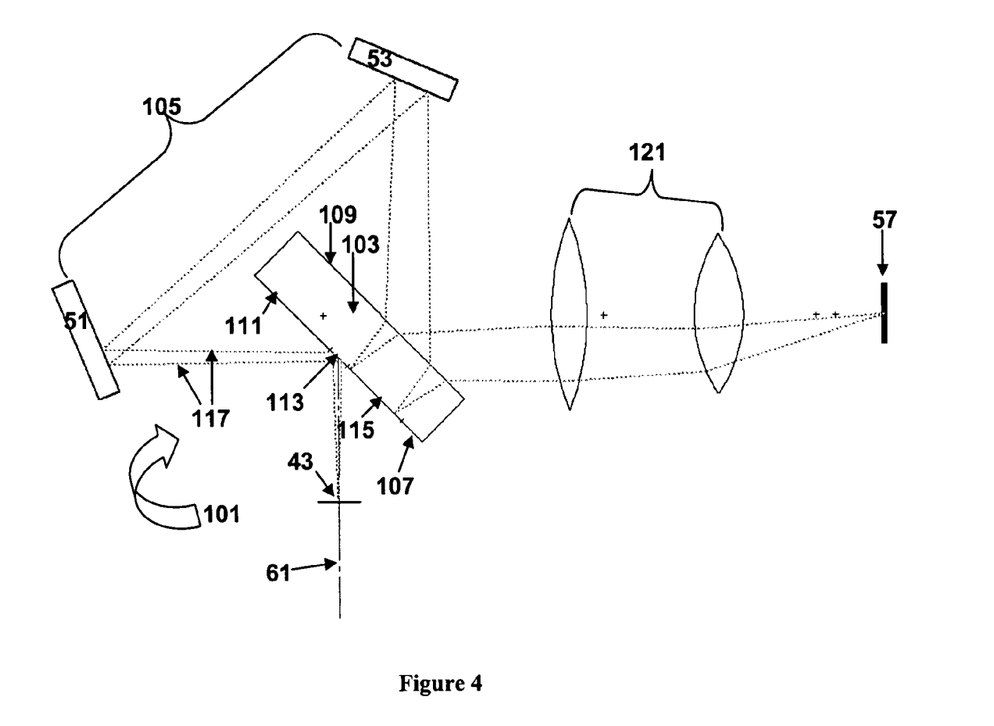
FIG. 4 is an additional partial optical schematic of the first embodiment of the present invention, particularly illustrating the single element beam splitter and the reflected portion of the beam.
Figure 5:
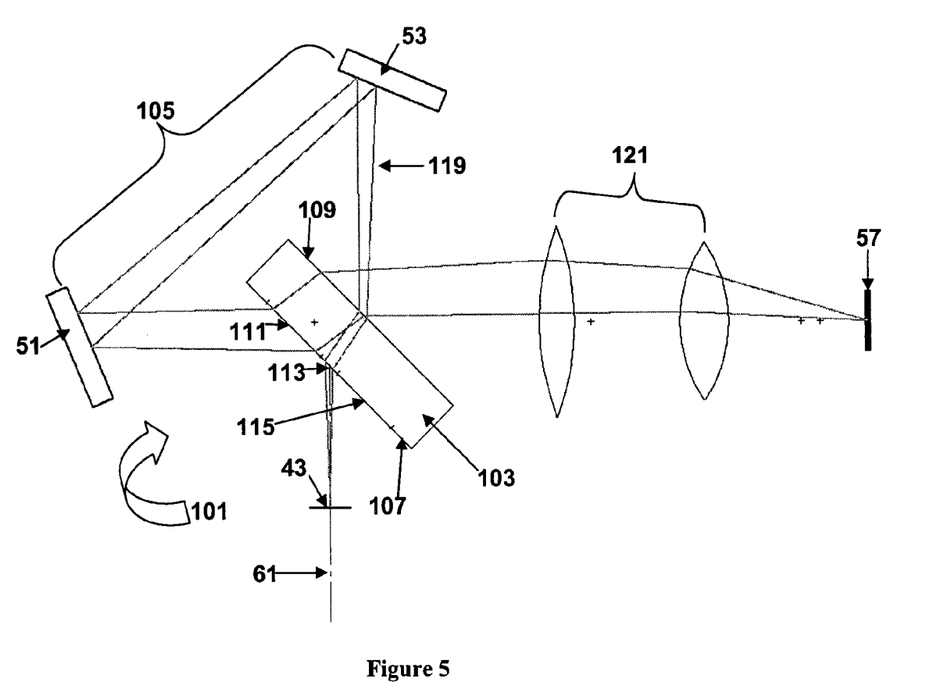
FIG. 5 is an additional partial optical schematic of the first embodiment of the present invention, particularly illustrating the single element beam splitter and the transmitted portion of the beam.
Figure 6:
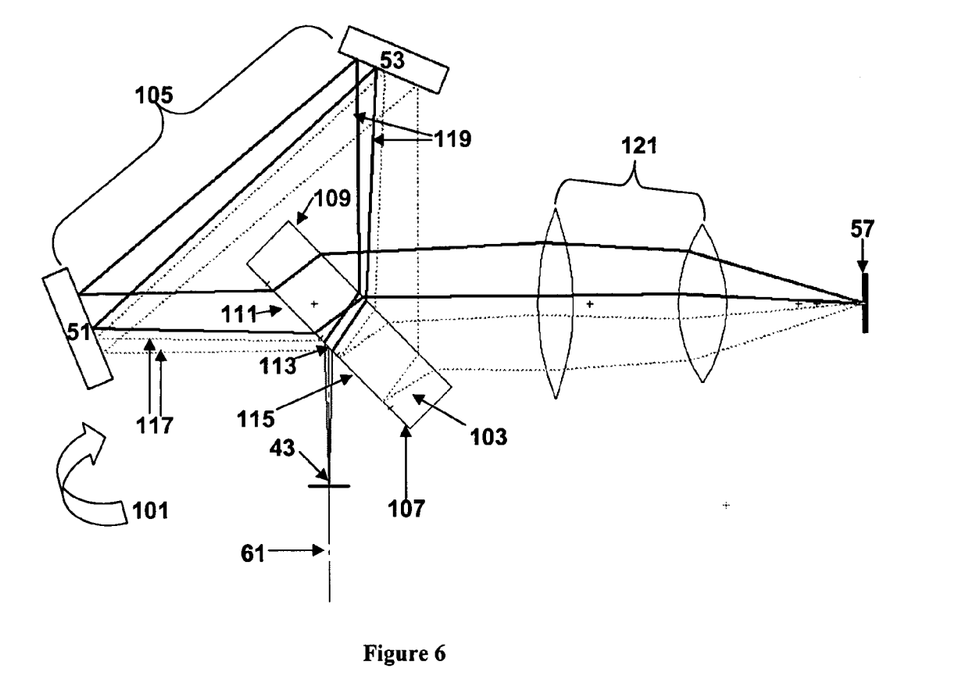
FIG. 6 is a partial optical schematic of the first embodiment of the present invention illustrating, inter alia, the convergence of the transmitted and reflected portions of the beam of FIGS. 4 and 5.

To solve this inherent problem of the Sagnac (or common path) interferometer, beam splitter 103 (as referenced on FIGS. 4, 5, and 6) is incorporated into the interferometer optics 105 of spectrometer 101, replacing beam splitter 49. FIG. 4 is a partial optical schematic that illustrates the use of beam splitter 103 to reflect a portion of the incident light. FIG. 5 is a partial optical schematic that illustrates the use of beam splitter 103 to transmit a portion of the incident light. FIG. 6 represents the combination of reflected light path of FIG. 4 and the transmitted light path of FIG. 5. Spectrometer 101 further includes lens system 121 which is functionally equivalent to lens system 55 of FIG. 2, comprised of a cylindrical lens and a Fourier lens combined to recombine and focus the radiation on detector 57.

Beam splitter 103 is constructed with an optically transmissive and reflective material. Beam splitter 103 includes first surface 107 and parallel second surface 109. First surface 107 is divided into first zone 111, second zone 113, and third zone 115. In one embodiment all three zones are of equal lengths along first surface 107. In other embodiments, first zone 111 and third zone 115 are of equal lengths along first surface 107 with second zone 113 occupying the balance of length on first surface 107. In another embodiment zones 111, 113 and 115 may be of different lengths. Optionally, there are uncoated regions between the first and second zones and between the second and third zones. Third zone 115 (on surface 107) is coated to reflect substantially 100% of the incident light in a spectral bandwidth compatible with the desired operating optical bandwidth of the system. Second zone 113 is coated to partially reflect and partially transmit the incident light, normally 50% each. First zone 111 is coated with an anti-reflective (or transmissive) coating to transmit substantially 100% of the incident light.

In operation, with reference to FIGS. 4, 5 and 6, incident light, represented by ray path 61 is spatially filtered with aperture 43 and partially reflected and partially transmitted by the coating of zone 113 on surface 107 of beam splitter 103. FIG. 4 depicts the path of the reflected light as two paths as it is naturally dispersed, collectively referred to as path 117. FIG. 5 depicts the path of the transmitted light as two paths as it is naturally dispersed, collectively referred to as path 119. FIG. 4 further illustrates that reflected beam path 117 is reflected by mirrors 51 and 53 and is directed toward third zone 115 of beam splitter 103. Path 117 is incident upon second surface 109 of beam splitter 103 and is refracted toward the third zone 115 of first surface 107 where path 117 is reflected back through beam splitter 103 toward second surface 109. Beam 117 is refracted upon exiting beam splitter 103 toward lens system 121 where one axis is focused upon detector 57 to image aperture 43 and the orthogonal axis is interfered on detector 57. The angles of refraction, as is well known in the art, can be calculated by standard methodology.

FIG. 5 further illustrates the transmitted beam path 119 of spectrometer 101. Transmitted beam path 119 is reflected by mirrors 51 and 53 and is directed toward first zone 111 of beam splitter 103 where it is further transmitted and refracted through first zone 111 of beam splitter 103 toward lens system 121 where one axis is focused upon detector 57 to image aperture 43 and the orthogonal axis is interfered on detector 57. The angles of refraction, as is well known in the art, can be calculated by standard methodology.

FIG. 6 shows the combination of beam paths 117 and 119 of spectrometer 101. FIG. 6 further illustrates beam paths being recombined by lens system 121 where one axis is focused upon detector 57 to image aperture 43 and the orthogonal axis is interfered on detector 57.

Figure 7:
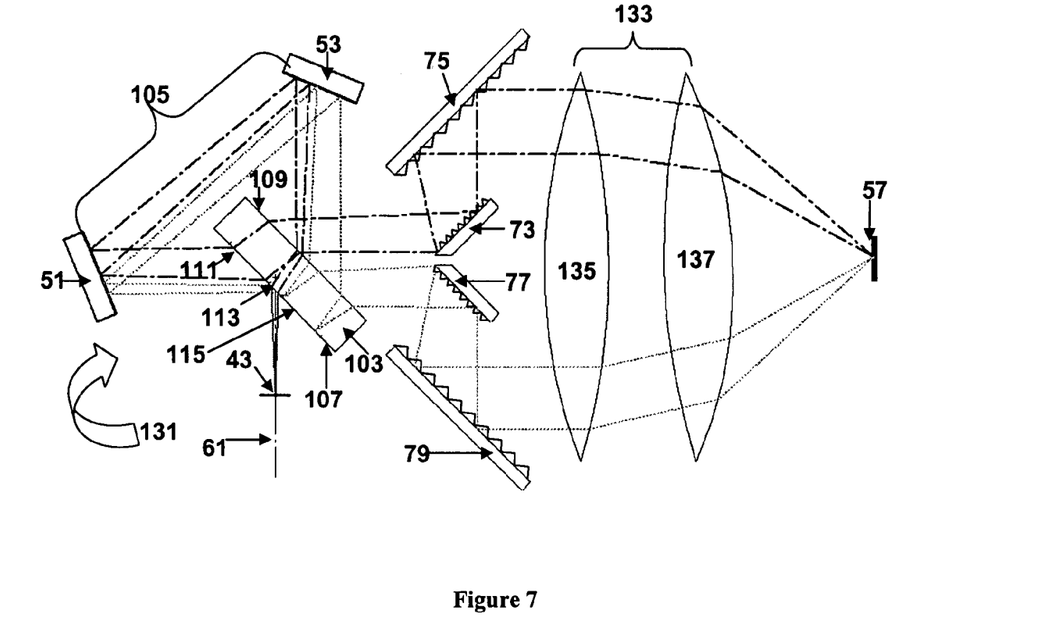
FIG. 7 is an optical schematic of the second embodiment of the present invention (FIG. 2) in which the prior art beam splitter is replaced by the two element beam splitter.

In the spectrometer 131 of FIG. 7, beam splitter 103 is incorporated into the invention as depicted in FIG. 3. Beam splitter 103 takes the place of the conventionally designed beam splitter 49, and the disclosure of FIGS. 4, 5 and 6 is incorporated into the description of FIG. 7. The embodiment of the invention as depicted in FIG. 7 has multiple advantages over the prior art. First, it incorporates the benefits of gratings being placed after the beam splitter apparatus as described with reference to FIG. 3 above. Second, the new beam splitter increases the throughput of the interferometer by approximately 100% as compared to the conventional interferometer design. Grating pairs 73, 75 and 77 and 79 function in the same manner as is disclosed with reference to FIG. 3 above. The choice of grating pitch, grating order, etc., is determined in the manner set forth with regard to, for instance, the embodiments of FIGS. 2 and 3 of U.S. Pat. No. 6,687,007 B1, and will not be affected by the index of refraction of the substrate material of beam splitter 103. FIG. 7 also depicts lens system 133 which is the functional equivalent of lens system 85 of FIG. 3. As is well known in the art, lens system 133 includes a spherical (Fourier) lens 135 and a cylindrical lens 137 and functions to recombine the split beam paths onto detector 57 and to image in one axis aperture 43.

Figure 8:
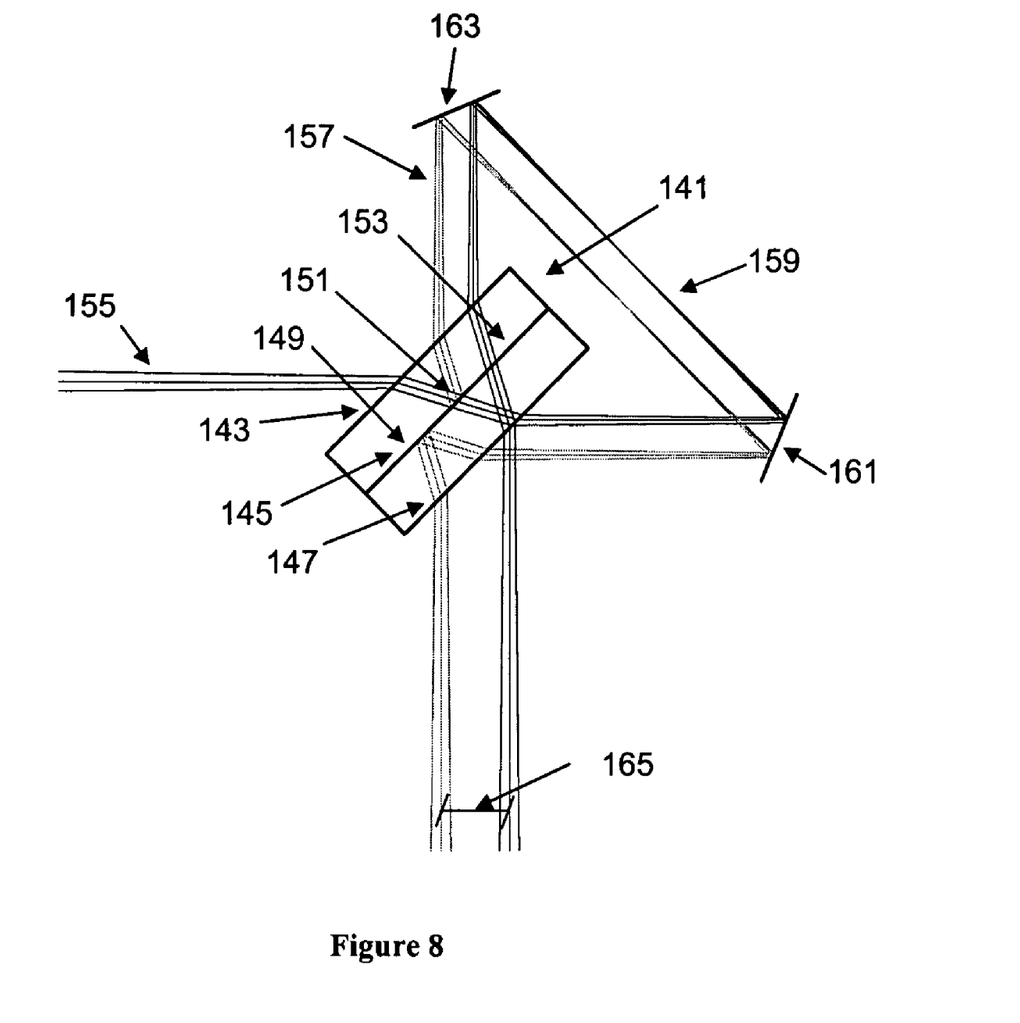
FIG. 8 is an optical schematic of the novel beam splitter composed of two elements and three surfaces.

In FIG. 8 beam splitter 141 is comprised of two optical elements each of which has the same optical path length (e.g., the same refractive index and thickness) which, collectively, include first surface 143, second surface 145 and third surface 147. Similar to the first surface of beam splitter 103 (shown with reference to FIGS. 4-7 above), second surface 145 is divided into first zone 149, second zone 151 and third zone 153. In one embodiment all three zones are of equal length along second surface 145. In other embodiments, first zone 149 and third zone 153 are of equal length along second surface 145 with second zone 151 occupying the balance of length on second surface 145. In a further embodiment, first zone 149, second zone 151 and third zone 153 are of different lengths. As with beam splitter 103, optionally there are uncoated regions between the first and second zones and between the second and third zones. First zone 149 (on surface 145) is coated to reflect substantially 100% of the incident light in a spectral bandwidth compatible with the desired operating optical bandwidth of the system in which beam splitter 141 is incorporated. Second zone 151 is coated to partially reflect and partially transmit the incident light, normally 50% each. Third zone 153 is coated with an anti-reflective (or transmissive) coating to transmit substantially 100% of the incident light.

In operation, incident light, represented by ray path 155, is partially reflected and partially transmitted by second zone 151 on second surface 145 after being refracted by first surface 143. Beam path 157 represents the path of the reflected light and beam path 159 represents the path of the transmitted light. Reflected beam path 157 is reflected by mirrors 163 and 161 and is refracted by third surface 147 such that it is incident upon first zone 149 of second surface 145. Path 157 is then reflected back through beam splitter 141 toward third surface 147. Beam 157 is refracted upon exiting beam splitter 141 toward lens system (not shown) where one axis focuses an image of an aperture (not shown) upon a detector (not shown) and the orthogonal axis is interfered on a detector (not shown). The angles of refraction, as is well known in the art, are calculated by standard methodology.

FIG. 8 further illustrates the transmitted beam path 159. Transmitted beam path 159 is reflected by mirrors 161 and 163, refracted by first surface 143 such that it is directed toward third zone 153 of second surface 145, where it is further transmitted until being refracted by third surface 147 and directed toward a lens system (not shown) where one axis is focuses an image of the aperture (not shown) upon a detector (not shown) and the orthogonal axis is interfered on a detector (not shown). Spacing 165 is set to Nyquist sampling and can be adjusted by adjusting mirror 161.

Beam splitter 141 can replace beam splitter 103 as described in previous embodiments (shown with reference to FIGS. 4-7). Beam splitter 141 has been shown to make the aberrations identical for the two optical paths, as compared to beam splitter 103, and thus reduce aberrations in the interferogram In FIG. 9 beam splitter 171 is composed of two prisms 173 and 175 which, when assembled together from a cube 177. The optical path lengths (e.g., refractive indices and thicknesses) of both prisms are identical. With this design there are four external optically functional surfaces 181, 183, 185 and 187, as opposed to just two (surfaces 143 and 147) in case of beam splitter 141. Further, there is an internal diagonal interface, referred to as surface 189 for convenience, formed by the mating surfaces of prisms 173 and 175, divided into first zone 191, second zone 193 and third zone 195. In one variation all three zones are of equal length along surface 189. In other variations, first zone 191 and third zone 195 are of equal length along surface 189 with second zone 193 occupying the balance of the length on surface 189. In a further variation, first zone 191, second zone 193 and third zone 195 are of different lengths. Further, as with beam splitter 103 and 141, there may be uncoated regions between each of these zones. First zone 191 is coated to reflect substantially 100% of the incident light in a spectral bandwidth compatible with the desired operating optical bandwidth of the system in which beam splitter 171 is incorporated. Second zone 193 is coated to partially reflect and partially transmit the incident light, normally 50% each. Third zone 195 is coated with an anti-reflective (or transmissive) coating to transmit substantially 100% of the incident light. Finally, each of surfaces 181, 183, 185 and 187 can be coated with an anti-reflective coating.

Figure 9:
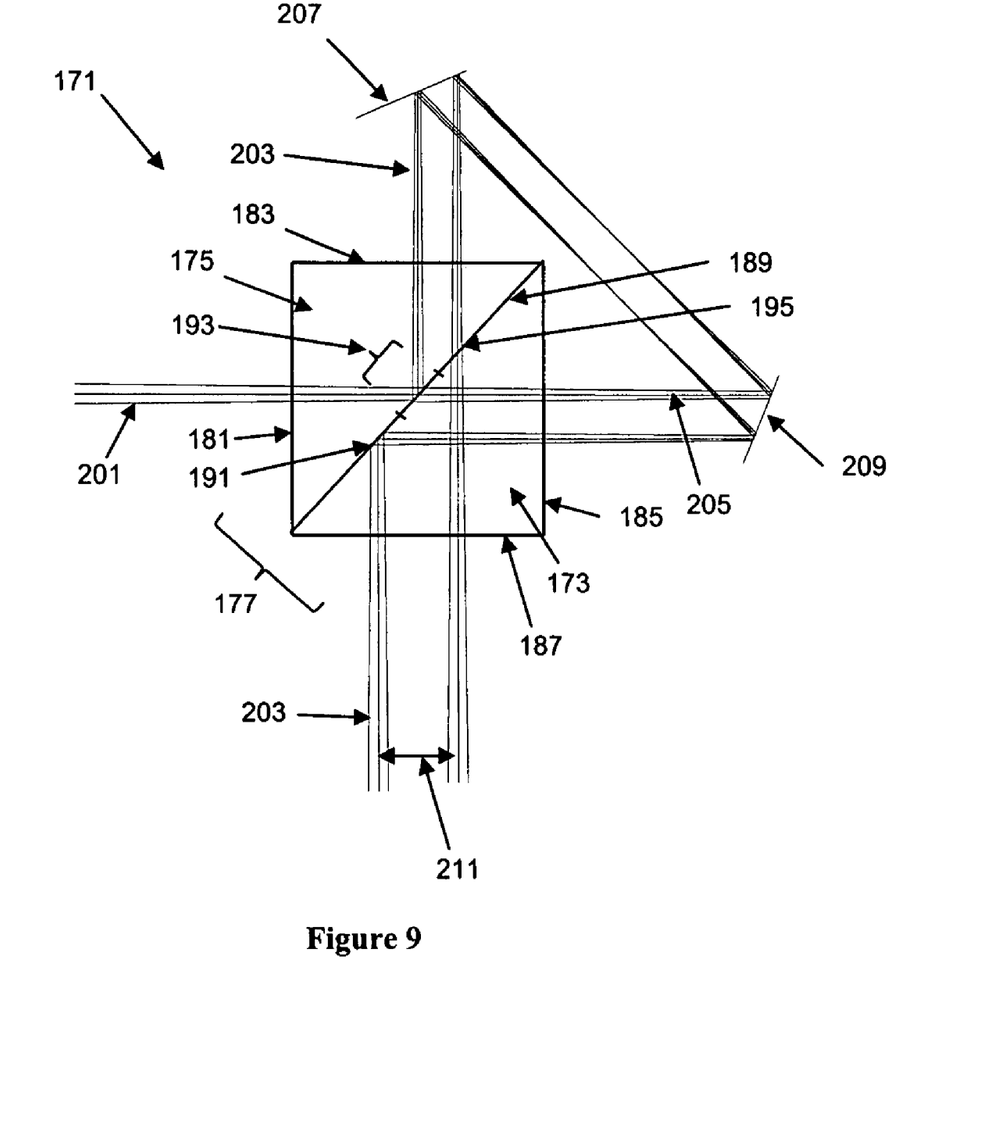
FIG. 9 is an optical schematic of the novel beam splitter in which the two elements form a cube, whereby all the exterior surfaces of the beam splitter are perpendicular to, as the case may be, the incoming or exiting beam.

In operation, incident light, represented by ray path 201, is partially reflected and partially transmitted by second zone 193 on surface 189 after passing through surface 181 without being refracted. Beam path 203 represents the path of the reflected light and beam path 205 represents the path of the transmitted light. Reflected beam path 203 is reflected by mirrors 207 and 209 and passes through surface 185 without being refracted such that it is incident upon first zone 191 of surface 187. Path 203 is then reflected back through prism 173 through surface 187, without being refracted, exiting toward a lens system (not shown) where one axis focuses an image of an aperture (not shown) upon a detector (not shown) and the orthogonal axis is interfered on a detector (not shown).

FIG. 9 further illustrates the transmitted beam path 205. Transmitted beam path 205 is reflected by mirrors 209 and 207, passes through surface 183 without being refracted and directed toward third zone 195 of surface 189, where it is further transmitted through surface 187 (again without being refracted) and directed toward a lens system (not shown) where one axis is focuses an image of the aperture (not shown) upon a detector (not shown) and the orthogonal axis is interfered on a detector (not shown). Spacing 211 is set to Nyquist sampling and can be adjusted by adjusting mirror 209.

Beam splitter 171 can replace beam splitter 103 or beam splitter 143 in the above described interferometers (e.g., FIGS. 4-7). As with beam splitters 103 and 143, beam splitter effectively eliminates the loss of light, and resulting inefficiency, inherent in the prior art (e.g., Smith). It, like beam splitter 143, has the further improvement that both beams have the same optical path length so that the aberrations for both beams are identical. Finally, the cube design of beam splitter 171 is very rugged and is advantageous in the construction of Sagnac interferometers.

Whereas the drawings and accompanying description have shown and described the preferred embodiment, it should be apparent to those skilled in the art that various changes may be made in the form of the invention without affecting the scope thereof.

What is claimed is:

1. A beam splitter for splitting wavelengths of electromagnetic radiation, said beam splitter comprising: an optically transmissive member including first and second optically transmissive elements, both of said elements having the same optical path lengths, said first element having a first surface, said second element having a second surface which mates with said first surface, the interface between said first and second mating surfaces defining an internal surface; said internal surface being divided into first, second and third zones; said first zone having a first coating which, for said wavelengths, is substantially 100% reflective; said second zone having a second coating which, for said wavelengths, is partially transmissive and partially reflective; said third zone having an anti-reflective coating being substantially 100% transmissive; and said second zone being between said first and said third zone.

2. The beam splitter of claim 1, wherein said second coating is, approximately, 50% reflective and 50% transmissive.

3. The beam splitter of claim 1, wherein there is a first uncoated region between said first zone and said second zone and a second uncoated area between said second zone and said third zone.

4. The beam splitter of claim 1, wherein said first optically transmissive element includes a third surface which is parallel to said internal surface, and wherein said second optically transmissive element includes a fourth surface which is parallel to said internal and third surfaces.

5. The beam splitter of claim 1, wherein said first optically transmissive element includes third and fourth surfaces which are perpendicular to each other and orthogonal to said internal surface, and wherein said second optically transmissive element includes fifth and sixth surfaces which are perpendicular to each other, said fifth surface being parallel to said third surface and said sixth surface being parallel to said fourth surface, whereby said optically transmissive member takes the form of a cube.

6. An optical system for dividing wavelengths of electromagnetic radiation into two portions, said system comprising:
   a. a beam splitter for splitting said wavelengths, said beam splitter comprising, an optically transmissive member having a surface, said surface being divided into first, second and third zones, said first zone having a first coating which, for said wavelengths, is substantially 100% reflective, said second zone having a second coating which, for said wavelengths, is partially transmissive and partially reflective, said third zone having an anti-reflective coating being substantially 100% transmissive, and said second zone being between said first and said third zone;
   b. means for directing said wavelengths upon said second zone; and
   c. first and second reflective means, said first and second reflective means being positioned relative to each other and said beam splitter such that,
      i. said wavelengths reflected off said second zone are then reflected off said first reflective means, then reflected off said second reflective means, and then reflected off said first zone, and
      ii. said wavelengths transmitted through said second zone are then reflected off said second reflective surface, then reflected off said first reflective surface, and then through said third zone.

7. The optical system of claim 6, wherein said second zone is between said first and said third zone.

8. The optical system of claim 6, wherein said first and second reflective means are, respectively, first and second reflective surfaces.

9. The optical system of claim 6, wherein said second coating is, approximately, 50% reflective and 50% transmissive.

10. The optical system of claim 6, wherein said reflected portion of said wavelengths constitutes a first beam, wherein said transmitted portion of said wavelengths constitutes a second beam, and further including optical means for converging and interfering both said transmitted portion and said reflected portion of said wavelengths after said reflected portion of said wavelengths has been reflected off said first coating and said transmitted portion of said wavelengths has been transmitted through said third zone.

11. The optical system of claim 10, wherein said means for interfering includes a Fourier lens.

12. The optical system of claim 11, wherein said means for converging includes a cylindrical imaging lens.

13. The optical system of claim 12, further including a detector sensitive to said wavelengths.

14. In an optical system including a beam splitter for splitting wavelengths of electromagnetic radiation, said beam splitter having an optically transmissive member with a surface divided into first, second and third zones, wherein said first zone has a first coating which is substantially 100% reflective, said second zone has a second coating which is partially transmissive and partially reflective and said third zone is substantially 100% transmissive, a method of dividing and then recombining said electromagnetic radiation whereby substantially 100% throughput is achieved, said method comprising:

(a) directing said beam of electromagnetic radiation onto said second zone to produce a reflected portion and a transmitted portion;

(b) redirecting said transmitted portion onto said third zone whereby substantially all of said transmitted portion is transmitted; and (c) redirecting said reflected portion onto said first zone whereby substantially all of said reflected portion is reflected.

15. The method as set forth in claim 14, further including the step of combining all of said transmitted portion and all of said reflected portion.

16. The method as set forth in claim 14, further including the steps of reflecting said transmitted portion a first time and a second time, said second time redirecting said transmitted portion through said third zone.

17. The method as set forth in claim 16 further including the steps of reflecting said reflected portion a first time and a second time, said second time redirecting said reflected portion onto said first zone.

* * * * *